United States Patent
Bhaskaran et al.

(10) Patent No.: US 8,892,147 B2
(45) Date of Patent: Nov. 18, 2014

(54) SYSTEM AND METHOD FOR SHARING MEDIA IN A GROUP COMMUNICATION AMONG WIRELESS COMMUNICATION DEVICES

(71) Applicant: QUALCOMM Incorporated, San Diego, CA (US)

(72) Inventors: Hamsini Bhaskaran, San Diego, CA (US); Beth Ann Brewer, San Diego, CA (US); Mark Aaron Lindner, Superior, CO (US); Eric Carl Rosen, Solano Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/651,115

(22) Filed: Oct. 12, 2012

(65) Prior Publication Data

US 2013/0040686 A1 Feb. 14, 2013

Related U.S. Application Data

(62) Division of application No. 12/141,493, filed on Jun. 18, 2008.

(60) Provisional application No. 60/945,102, filed on Jun. 20, 2007.

(51) Int. Cl.
- H04B 7/00 (2006.01)
- H04L 29/06 (2006.01)
- H04W 76/00 (2009.01)
- H04W 4/10 (2009.01)

(52) U.S. Cl.
CPC ......... *H04L 65/4061* (2013.01); *H04W 76/005* (2013.01); *H04L 65/403* (2013.01); *H04W 4/10* (2013.01)
USPC ........................... 455/518; 455/519; 455/90.2

(58) Field of Classification Search
CPC ... H04L 65/403; H04L 65/4061; H04W 4/10; H04W 76/005
USPC ............ 455/518, 519, 424, 90.2, 67.11, 413, 455/414.1, 550.1, 456.1, 450, 406, 422.1, 455/466, 416, 411; 370/296, 335, 328, 338, 370/392, 432, 352; 705/26
See application file for complete search history.

(56) References Cited

U.S. PATENT DOCUMENTS 7,231,206 B2 * 6/2007 Cudak et al. ............... 455/414.2
7,689,510 B2   3/2010 Lamkin et al.
(Continued)

FOREIGN PATENT DOCUMENTS

EP 1480439 A1 11/2004
EP 1575316 A2 9/2005
(Continued)

OTHER PUBLICATIONS

Written Opinion of the International Preliminary Examining Authority, PCT/US2008/067774, International Preliminary Examining Authority, European Patent Office, Aug. 21, 2008.

(Continued)

Primary Examiner — Tan Trinh
(74) Attorney, Agent, or Firm — Raphael Freiwirth

(57) ABSTRACT

A system, method, and wireless communication device for sharing media in a group communication among a plurality of wireless communications devices, such as among a Push-to-Talk (PTT) group. A wireless communication device that is a member of the communication group can send group-directed media, such as graphics, multimedia and applications, to other members of the communication group, either during a ongoing PTT communication, or independently there from. In one embodiment, a communication computer device stores information on communication groups on the wireless communication network that includes the member wireless communication devices of one or more communication groups, and receives group-directed media from a sending wireless communication device sends the group-directed media either directly to the other member wireless communication devices of the communication group or stores the group-directed media such that the other member devices can access and download the group-directed media.

36 Claims, 10 Drawing Sheets

(56) References Cited

U.S. PATENT DOCUMENTS

| | | | |
|---|---|---|---|
| 7,779,097 B2 | 8/2010 | Lamkin et al. | |
| 8,195,213 B2* | 6/2012 | Maggenti et al. | 455/518 |
| 8,365,060 B2 | 1/2013 | Wang et al. | |
| 2002/0049844 A1 | 4/2002 | Nishikawa | |
| 2002/0086665 A1 | 7/2002 | Maggenti et al. | |
| 2002/0103999 A1 | 8/2002 | Camnisch et al. | |
| 2003/0153341 A1 | 8/2003 | Crockett et al. | |
| 2003/0217118 A1 | 11/2003 | Kobayashi et al. | |
| 2004/0030995 A1 | 2/2004 | Bhogal et al. | |
| 2004/0128324 A1 | 7/2004 | Sheynman et al. | |
| 2004/0190468 A1 | 9/2004 | Saijonmaa | |
| 2004/0236768 A1 | 11/2004 | Saito | |
| 2005/0041625 A1 | 2/2005 | Brewer | |
| 2005/0124365 A1 | 6/2005 | Balasuriya et al. | |
| 2005/0172127 A1 | 8/2005 | Hartung et al. | |
| 2005/0287982 A1* | 12/2005 | Brewer et al. | 455/405 |
| 2006/0023747 A1 | 2/2006 | Koren et al. | |
| 2006/0026119 A1 | 2/2006 | Mirrashidi et al. | |
| 2006/0031309 A1 | 2/2006 | Luoffo et al. | |
| 2006/0046760 A1* | 3/2006 | Bertino et al. | 455/519 |
| 2006/0052127 A1 | 3/2006 | Wolter | |
| 2006/0073843 A1 | 4/2006 | Aerrabotu et al. | |
| 2006/0075455 A1 | 4/2006 | Koch et al. | |
| 2006/0120308 A1 | 6/2006 | Forbes et al. | |
| 2006/0168640 A1 | 7/2006 | Anttila et al. | |
| 2006/0171338 A1 | 8/2006 | Lim | |
| 2006/0221968 A1* | 10/2006 | Razdan et al. | 370/392 |
| 2006/0229015 A1 | 10/2006 | Park et al. | |
| 2006/0271636 A1 | 11/2006 | Balasuriya | |
| 2007/0002836 A1 | 1/2007 | Lindner | |
| 2007/0008830 A1 | 1/2007 | Tsukazaki et al. | |
| 2007/0011256 A1 | 1/2007 | Klein | |
| 2007/0016613 A1 | 1/2007 | Foresti et al. | |
| 2007/0021137 A1* | 1/2007 | Kokkonen et al. | 455/518 |
| 2007/0049314 A1 | 3/2007 | Balachandran et al. | |
| 2007/0054687 A1 | 3/2007 | Akita et al. | |
| 2007/0071210 A1 | 3/2007 | Schmidt et al. | |
| 2007/0076660 A1 | 4/2007 | Sung et al. | |
| 2007/0168419 A1 | 7/2007 | Sciammarella | |
| 2007/0195735 A1 | 8/2007 | Rosen et al. | |
| 2007/0208802 A1* | 9/2007 | Barman et al. | 709/203 |
| 2007/0216761 A1 | 9/2007 | Gronner et al. | |
| 2008/0005247 A9 | 1/2008 | Khoo | |
| 2008/0071875 A1 | 3/2008 | Koff et al. | |
| 2008/0091804 A1 | 4/2008 | Swanburg et al. | |
| 2008/0096597 A1* | 4/2008 | Vempati et al. | 455/518 |
| 2008/0136897 A1 | 6/2008 | Morishima et al. | |
| 2008/0242222 A1* | 10/2008 | Bryce et al. | 455/3.06 |
| 2008/0250100 A1 | 10/2008 | Hatanaka et al. | |
| 2008/0313342 A1 | 12/2008 | Wu | |
| 2008/0318610 A1 | 12/2008 | Bhaskaran et al. | |
| 2009/0028049 A1 | 1/2009 | Boudreau et al. | |
| 2009/0088191 A1 | 4/2009 | Norton et al. | |
| 2009/0106389 A1 | 4/2009 | Hakkarainen et al. | |
| 2009/0197652 A1 | 8/2009 | Lundstrom et al. | |
| 2010/0013905 A1 | 1/2010 | Kumar et al. | |
| 2010/0020745 A1 | 1/2010 | Agulnik et al. | |
| 2010/0076946 A1 | 3/2010 | Barker et al. | |
| 2010/0153395 A1 | 6/2010 | Hannuksela et al. | |
| 2010/0190478 A1 | 7/2010 | Brewer et al. | |
| 2010/0195578 A1* | 8/2010 | Razdan et al. | 370/328 |
| 2010/0281041 A1* | 11/2010 | Almeida | 707/755 |
| 2010/0332994 A1 | 12/2010 | Istvan et al. | |
| 2011/0055935 A1 | 3/2011 | Karaoguz et al. | |
| 2011/0201375 A1 | 8/2011 | Gill | |
| 2012/0015675 A1 | 1/2012 | Suetsugu et al. | |
| 2012/0020238 A1 | 1/2012 | Suetsugu et al. | |
| 2013/0040687 A1 | 2/2013 | Bhaskaran et al. | |
| 2013/0084912 A1 | 4/2013 | Lindner et al. | |
| 2013/0110954 A1* | 5/2013 | Barman et al. | 709/206 |
| 2013/0110956 A1* | 5/2013 | Barman et al. | 709/206 |
| 2013/0122872 A1 | 5/2013 | Brewer et al. | |
| 2013/0122955 A1 | 5/2013 | Brewer et al. | |
| 2013/0218995 A1* | 8/2013 | Barman et al. | 709/206 |
| 2014/0112244 A1 | 4/2014 | Lindner | |

FOREIGN PATENT DOCUMENTS

| | | |
|---|---|---|
| EP | 1708428 | 10/2006 |
| EP | 1781049 A1 | 5/2007 |
| EP | 1860907 A1 | 11/2007 |
| EP | 1863198 A1 | 12/2007 |
| GB | 2405768 | 3/2005 |
| GB | 2413730 A | 11/2005 |
| JP | 10322454 A | 4/1998 |
| JP | 2000115253 A | 4/2000 |
| JP | 2002189870 A | 7/2002 |
| JP | 2003086233 A | 3/2003 |
| JP | 2004348268 A | 12/2004 |
| JP | 2005512357 A | 4/2005 |
| JP | 2005514804 A | 5/2005 |
| JP | 2006004190 A | 1/2006 |
| JP | 2006514359 A | 4/2006 |
| JP | 2006191631 A | 7/2006 |
| JP | 2007067995 A | 3/2007 |
| JP | 2007124417 A | 5/2007 |
| JP | 2007148659 A | 6/2007 |
| JP | 2007258851 A | 10/2007 |
| JP | 2009514290 A | 4/2009 |
| JP | 2009516464 A | 4/2009 |
| JP | 2009516981 A | 4/2009 |
| WO | 02093954 A1 | 11/2002 |
| WO | 03026138 A2 | 3/2003 |
| WO | 03069947 A1 | 8/2003 |
| WO | 2004061571 A2 | 7/2004 |
| WO | 2004086715 | 10/2004 |
| WO | 2006059206 A1 | 6/2006 |
| WO | 2006127168 A1 | 11/2006 |
| WO | 2007005971 | 1/2007 |
| WO | 2007020685 A1 | 2/2007 |
| WO | 2007048793 A2 | 5/2007 |
| WO | 2007058469 A1 | 5/2007 |
| WO | 2007061234 A1 | 5/2007 |
| WO | 2008087742 A1 | 7/2008 |

OTHER PUBLICATIONS

International Search Report, PCT/US2008/067774, International Searching Authority, European Patent Office, Dec. 2, 2008.

Written Opinion, PCT/US2008/067774, International Searching Authority, European Patent Office, Dec. 2, 2008.

International Preliminary Report on Patentability, PCT/US2008/067774, International Preliminary Examining Authority, European Patent Office, Oct. 12, 2009.

European Search Report, EP 11178534, Search Authority—Munich Patent Office, Sep. 28, 2011.

Martin G.M., et al "A Mechanism to Enable File Transfer with the Session Initiation Protocol (SIP); draft-garcia-sipping-file-transfer-mech-OO .txt" IETF Standard-Working-Draft, Internet Engineering Task Force, IETF, CH, Feb. 23, 2006, pp. 1-20, XP015043461 p. 3-p. 9.

European Search Report—EP13187454—Search Authority—Munich—Dec. 10, 2013.

European Search Report—EP13187456—Search Authority—Munich—Dec. 6, 2013.

Vatsa R., et al., "Role of media transformation in multimedia messaging", IEEE, pp. 258-262, 2005.

Anonymous: "Sending Places and Group Icons", WhatsApp Blog, Jan. 2, 2013, pp. 1-5, XP055103982, Retrieved from the Internet: URL: http://web.archive.org/web/20130102005856/http://blog.whatsapp.com/index.php/2012/03/sending-places-and-group-icons/ [retrieved on Feb. 24, 2014].

* cited by examiner

SYSTEM AND METHOD FOR SHARING MEDIA IN A GROUP COMMUNICATION AMONG WIRELESS COMMUNICATION DEVICES

CROSS-REFERENCE TO RELATED APPLICATIONS

This application is a divisional of U.S. patent application Ser. No. 12/141,493, entitled, "SYSTEM AND METHOD FOR SHARING MEDIA IN A GROUP COMMUNICATION AMONG WIRELESS COMMUNICATION DEVICES, filed Jun. 18, 2008, which claims the benefit of priority to U.S. Provisional Patent Application No. 60/945,102, entitled "SYSTEM AND METHOD FOR SHARING MEDIA IN A GROUP COMMUNICATION AMONG WIRELESS COMMUNICATION DEVICES, filed Jun. 20, 2007, the entire contents of both of which are incorporated herein by reference.

BACKGROUND OF THE INVENTION

1. Field of the Invention

The present invention relates to point-to-point or point-to-multipoint wireless communications systems. More specifically, the present invention relates to systems and methods for sharing various forms of media between members of a communicating group of wireless telecommunication devices.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices often have limited to significant data processing and computing capability, and can accordingly send and receive software programs, in addition to voice, across the telephone network.

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

In existing PTT systems, member devices will only communicate voice data between the devices in an active group communication. It is difficult to include other data in the group communication because of the size of the data and the device resources necessary to handle non-voice data. The existing mobile devices therefore send non-voice data, such as graphics, multimedia and other data files, through specific data channels established between the device and a wireless communication network.

Accordingly, it would be advantageous to provide a system and method for a wireless device member of a group to send media to others member of the PTT target group. The system and method should be able to accommodate group-directed media data of large size without compromising the integrity of other PTT communications or unduly utilizing device resources. It is thus to the provision of such a system and method to allow group-directed media among wireless devices in a PTT group that the present invention is primarily directed.

SUMMARY OF THE INVENTION

Briefly described, the present invention includes a system, method, and wireless communication device that allows the sharing of media between communication groups on wireless communication networks. In the system, the user can attach a data file, data block, or other application-specific data, which can be a picture, an audio clip, a voice mail message, and the like, and send it to one or more other member's wireless devices. The distribution data path for the group-direct media can be independent from the same data path of the PTT voice communications, or can be independent of it such that the feature can be accessed at any time, whether the user is participating in a PTT call or not. In one embodiment, the originator of the group-directed media can select a target list of members to receive the data file, and the target list can be one or more user addresses, one or more group addresses, or a combination of the two.

In one embodiment, if the originator of the group-directed media is participating in a PTT call, the originator can elect to send the file to one or more participants of the same PTT call by uploading the file to a server and then the server or the originator can notify the target wireless devices that a file is available for download. The target users are provided the option to allow or decline the downloading of the file on to the target client. Alternately, the target users are provided a pointer, such as a hyperlink, to the stored file where they can later obtain that file without necessarily downloading to the wireless communication device. Furthermore, the system can be embodied such that the target user can periodically browse or poll the file server to check and see if media is available for download.

In one embodiment, the system for sharing media in a group communication among a plurality of wireless communications devices includes at least one wireless communication device that is a member of a communication group of wireless communication devices that communicate with each other in direct group communications across a wireless communication network, such as PTT voice communications. The wireless communication device will selectively send group-directed media to other members of the communication group, and at least one communication computer device stores information on communication groups on the wireless communication network that includes the member wireless communication devices of one or more communication groups. The communication computer device selectively receives group-directed media from a sending wireless communication device of a communication group and sends the group-directed media to the other member wireless communication devices of the communication group for the sending wireless communication device. The communication computer device can be selectively in communication with a data store to store the group-directed media for the member wireless communication devices to access the media. The wireless communication device may also be a desktop, laptop or other stationary computer platform that can have a wired connection to Internet or other network, and otherwise engage in group-communications with the other wireless communication devices.

In one embodiment, the method for sharing media in a group communication among a plurality of wireless communications devices on a wireless communication network includes receiving at a communication computer device the group-directed media sent from a wireless communication device to other members of the communication group for the wireless communication device, with the wireless communication device a member of a communication group of wireless communication devices that communicate with each other in direct group communications across a wireless communication network The communication computer device storing information including the member wireless communication devices of one or more communication groups, and then sending the group-directed media from the communication computer device to one or more of the other member wireless communication devices of the communication group for the sending wireless communication device.

The present system and method are therefore advantageous in that a wireless communication device member of a communication group has the ability to share media among the other member devices of the communication group, such as a PTT target group, either during an ongoing group communication or separately there from. The system and method allows the group-directed media of any size to be communicated without unduly utilizing device resources. Moreover, the group-directed media can be in virtually any data type and include active and accessible computer applications.

Other objects, features, and advantages of the present invention will become apparent after review of the Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Figure 1:
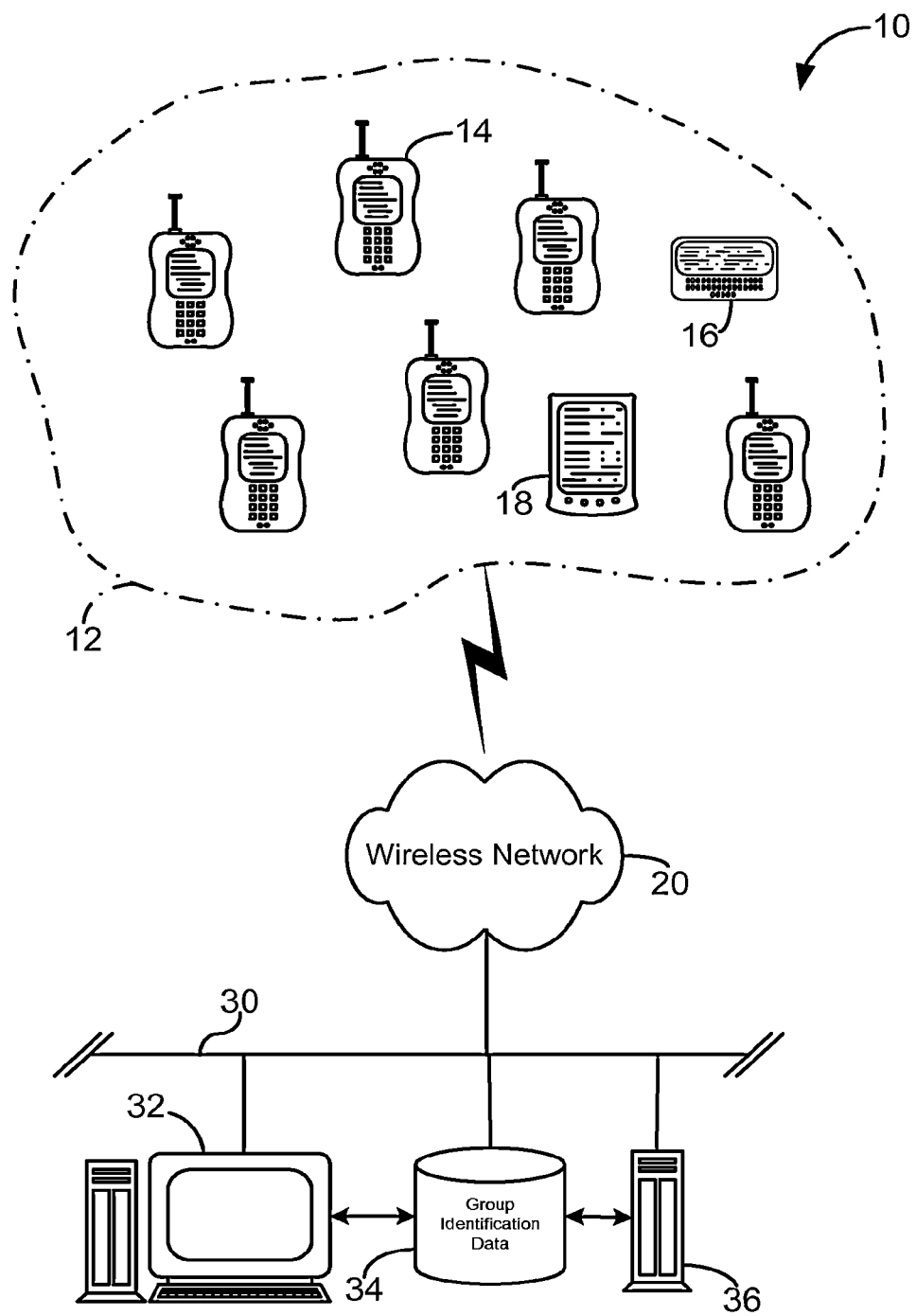
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the communication computer device, shown here as server 32, which is present on a server-side LAN 30 across the wireless network 20, to indicate that the wireless device is present, i.e. accessible, on the wireless network 20. The communication computer device 32 can share this information with the set of target wireless telecommunication devices designated by the first wireless telecommunication device, or can also share is with other computer devices resident on the server-side LAN 30 or accessible across the wireless network 20. The communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the communication computer device 32 can attempt to bridge the requested direct communication with the target set if at least one of the wireless telecommunication devices of the target set have informed the communication computer device 32 of their presence on the wireless network 20.

The communication computer device 32 can also inform the wireless telecommunication device 14,16,18 of the inability to bridge a direct communication to the target set 12 upon none of the wireless telecommunication devices (or at least one) of the target set not having informed the communication computer device 32 of their presence on the wireless network 20. Further, while the communication computer device 32 is shown here as having the attached database 34 of group identification data, the communication computer device 32 can have group identity data resident thereupon, and perform all storage functions described herein.

In overview, the system 10 includes at least one wireless communication device, such as mobile telephone 14, that is a member of a communication group 12 of wireless communication devices that communicate with each other in direct group communications across a wireless communication network 20, the at least one wireless communication device configured to selectively send group-directed media to other members of the communication group 12. At least one communication computer device 32 is configured to store information on communication groups 12 on the wireless communication network 20, the information including the identity of the specific member wireless communication devices of one or more communication groups. The communication computer device 32 is further configured to selectively receive group-directed media from a sending wireless communication device, such as mobile telephone 14, of a communication group 12 and send the group-directed media to the other member wireless communication devices of the communication group 12 for the sending wireless communication device.

The system 10 can further include a data store 36 in communication with the communication computer device(s) 32, with the communication computer device 32 configured to send group-directed media to the data store 36, as is further described herein. The data store 36 configured to receive the group-designated media from the wireless communication device (such as mobile phone 14) and selectively permit members of the communication group 12 for which the group-directed media was sent to access the stored group-directed media across the wireless communication network 20.

The group-directed media can be graphic media, such as pictures in JPEG, TIF, and the like, audio files such as MP3, MP4, WAV, and the like. The media can also be streaming media, such as a multimedia application (Powerpoint, MOV file, and the like), and other application-specific data or custom data for an application, either resident at the wireless communication device 14,16,18 or in communication therewith. The group-directed media can also be streaming media, or an interactive session on another computer device on the wireless communication network 20, such as a game hosted on data store 36 or private bulletin board. For example, participants in a game can chat via the group-communication about the ongoing game. Also, the group-directed media could be half-duplex video conferencing among members of the communication group wherein the picture of the speaker is broadcast to the other group members in substantial real-time, or in delay.

The size of these media files can be very large, and because of the potential delay of sending the media, or inability of the receiving wireless communication device to handle the sent media, the system 10 can use a data store 36 (or file management server or other computer device) to store the group-directed media such that target members of the communication group 12 can selectively access the stored media without interrupting other PTT communications. The data store 36 can be configured to automatically send the group-directed media to each of the member wireless devices of the communication group 12 upon establishing a communication link therewith. Alternatively, in one embodiment, if the group-directed media is stored at the data store 36, the communication computer device 32 or the data store 36 can send a hyperlink to the other member wireless communication devices of the communication group 12, that will provides a link to the stored group-directed media at the data store 36. Upon receipt of the group-directed media by at least one of the member wireless devices of the communication group, the communication computer device 32 can send to the wireless communication device 14,16,18 sending the group-directed media an acknowledgement that at least one member wireless communication device of the communication group 12 received the group-directed media.

The wireless communication device 14,16,18 can send communication group identification data to the communication computer device 32 at the time of requesting the group-directed media to be sent, e.g. send a target list, and thus, the group communication device 32 will send or store the group-directed media to the member wireless communication devices identified in the communication group identification data based upon a variety of criteria as is further discussed herein. Alternately, prior to the wireless communication device sending group-directed media, the wireless communication device 14,16,18 can request member data for a communication group 12 from the communication computer device 32, and the communication computer device 32 can send one or more addresses or communication group addresses to the wireless communication device 14,16,18. In one embodiment, the communication group computer device 32 can filter the potential communication groups available based upon their member devices' capability to received group-directed media.

As is further described herein, the wireless communication device 14,16,18 can be engaged in a group communication with the member wireless communication devices of the communication group 12, and send group-directed media during the group communication in the same communication session, or independently there from. Alternately, the group-directed media can be sent independently of the group-communication session.

Figure 2:
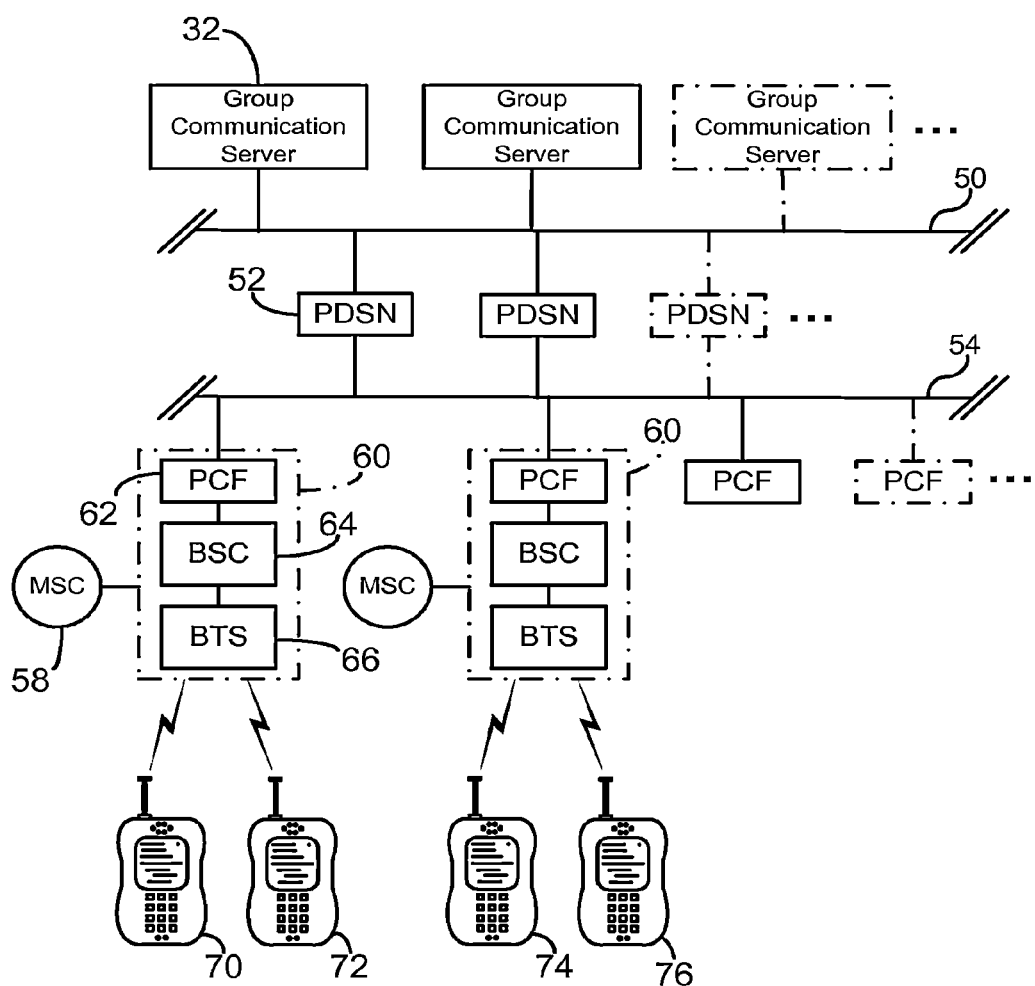
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service provider's packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the communication computer device 32. All data packets of the devices do not necessarily have to travel through the communication computer device 32 itself, but the communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
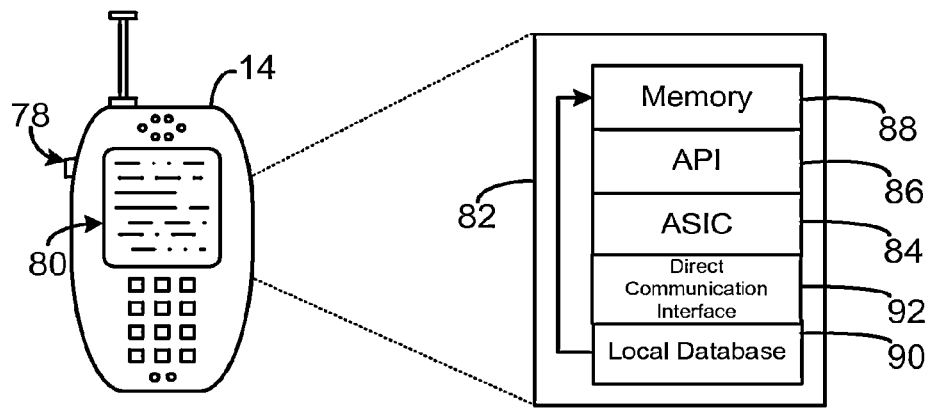
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. Other devices and methods can be alternately used to engage in a PTT communication, such as a "soft key" on a touch screen display, voice command, or other methods as known in the art. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
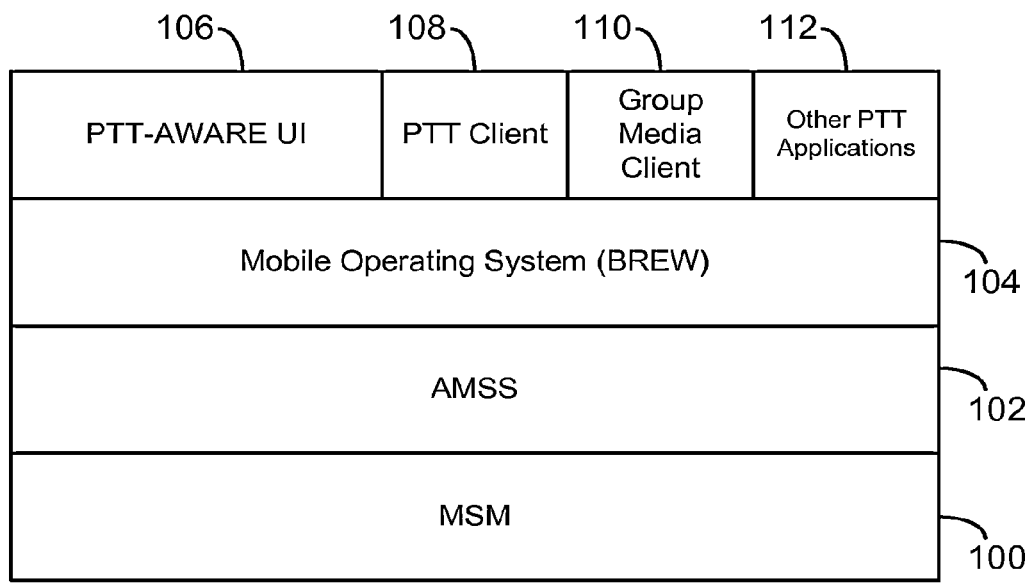
FIG. 4 is a diagram of one embodiment of the software layers of the communication group application, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM, drives the underlying MSM chipset and implements the software protocol stack for the entire suite of CDMA communication technologies that include CDMA2000 IX and CDMA2000 1xEV-DO. There is a mobile operating system layer 104, which in this embodiment is BREWED, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released. It should be noted that other software layer configurations can be alternately used on the wireless communication device 14,16,18 computer platform 82, such as a Linux, Windows®, or other operating system or architecture, to implement the sharing of media as described herein.

The PTT Client 108 is an application that offers access to PTT services through an external interface, here shown at a PTT-aware VI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware VI is an application that may be developed entirely as a mobile operating system-based application or used in combination with an AMSS 102 interface. The Group Media Aware VI responds to user requests for group-directed media services by invoking the appropriate APIs, such as those from other resident PTT and group media applications 112. The Group Media Client 110 services the requests from the user and informs the user the result of any group-directed media request. The user can also have setting on the Group Media Client 110, that specify how to handle an incoming notification that indicates there is a file to be downloaded from the file management server (data store 36). For example, the Group Media Client 110 can elect to have the file download commence immediately or to allow the target user to be prompted to determine whether to download the file.

Figure 5:
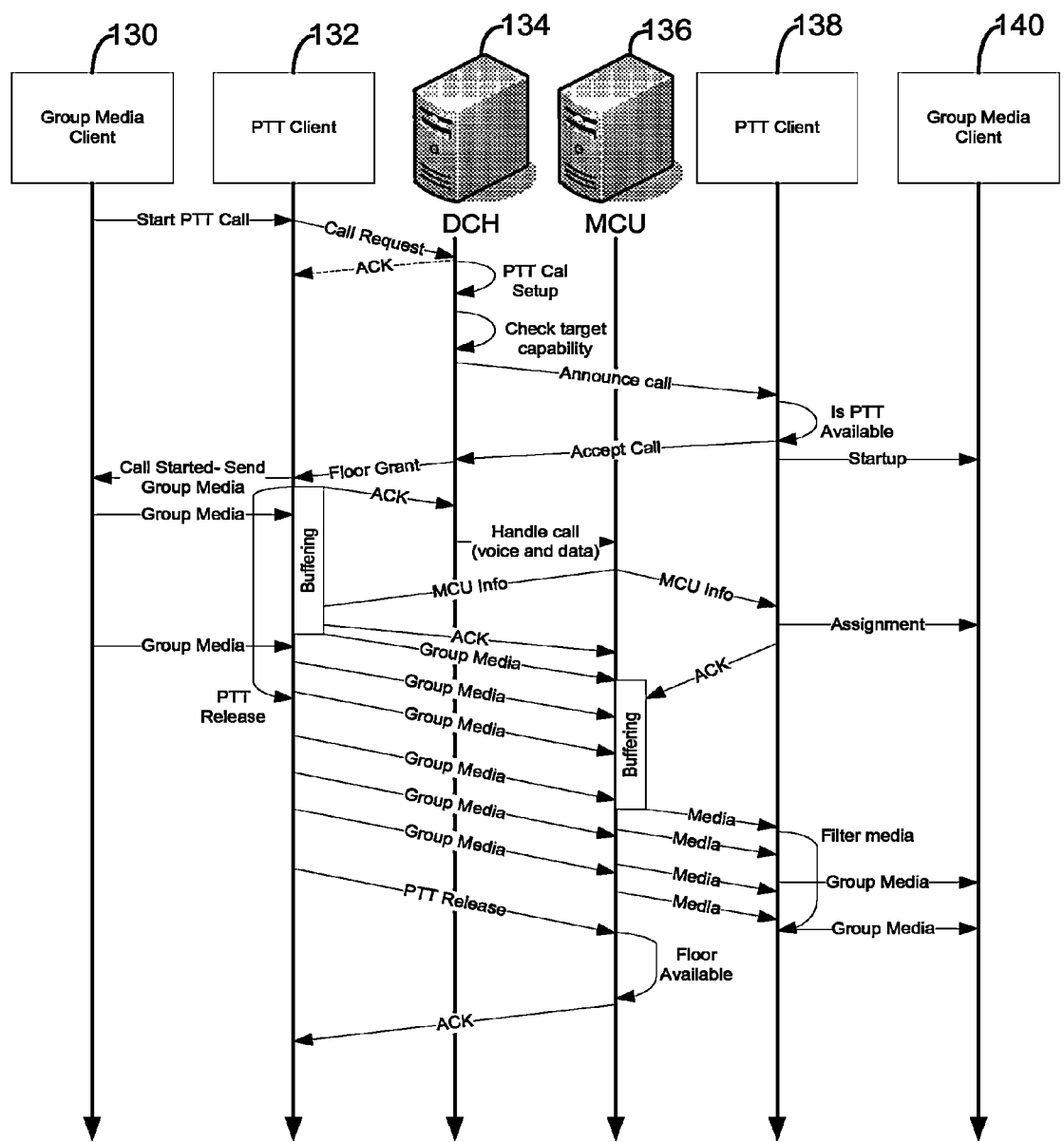
FIG. 5 is a call flow diagram of one embodiment of the establishment of a PTT communication and a group-directed media transmission between communication group member wireless communication devices

FIG. 5 is a call flow diagram of one embodiment of the establishment of a PTT communication and a group-directed media transmission between communication group member wireless communication devices. Resident on a communicating wireless device 14,16,18, a Group Media Client 130 requests that the PTT Client 132 establish a direct PTT call to share group-directed media and voice with the target device, shown here as having resident PTT Client 138 and Group Media Client 140. As shown, the Group Media Client indicates that the same floor control mechanism can be used for both the voice media and the group-directed media. The Group Media Client 130 determines that data can be shared during subsequent talk bursts from the PTT usage, and thus, there is a single floor control mechanism used for both the voice call and the sharing of the group-directed media. The Group Media Client 130 requests that the PTT Client 132 establish a PTT direct call with the target user and include a group-directed media type to the PTT call. The call setup request can contain, for instance, the target user address, the Group Media application ID, the media type, and an indication that the group-directed media data is to be shared using the same floor control mechanism as the PTT call. The call setup request may also be sent with a DataOverSignaling Access channel message The Dispatch Call Handler (DCH) 134 performs the PTT call setup functions, including locating the target, applying call restrictions, selecting a vocoder and assigning Media Control Unit (MCU) 136 resourced. In addition, the DCH 134 verifies that the target client can support the group-directed media type. Then the DCH 134 notifies the target member that a PTT call is being established with group-media data included.

The target PTT Client 138 verifies that the target user is available to participate in the call and that the Group Media Client 140 associated with the group-directed media application ID is present on the target client device. The target PTT Client 138 sends an acknowledgement to the DCH 134 indicating that the call has been accepted. Once the acknowledgement is received from the target PTT Client 138, the DCH 134 sends a floor grant message to the originating PTT Client 132, which indicates the call is being established and the PTT Client 132 can start collecting media. The PTT Client 132 notifies the Group Media Client 130 that the call setup was successful and group-directed media can be sent. The PTT Client 132 also notifies the user that the user can begin speaking. The PTT Client 132 collects and buffers both the voice media (the user's talk spurt) and the group-directed media that is received from the group Media Client 130. Once the MCU 136 contact information message is received and acknowledged by the originating PTT Client 132, the buffered media is sent to the MCU 136. The MCU 136 waits for the target PTT Client's 138 acknowledgment of the MCU 136 contact information message prior to forwarding the media to the target. When the target PTT Client 138 receives the media, it may filter the media based on the synchronization source (SSRC) and payload type to process the PTT media correctly. The group-directed media is forwarded to the Group Media Client 140, which may also be responsible for processing that data.

Figure 6:
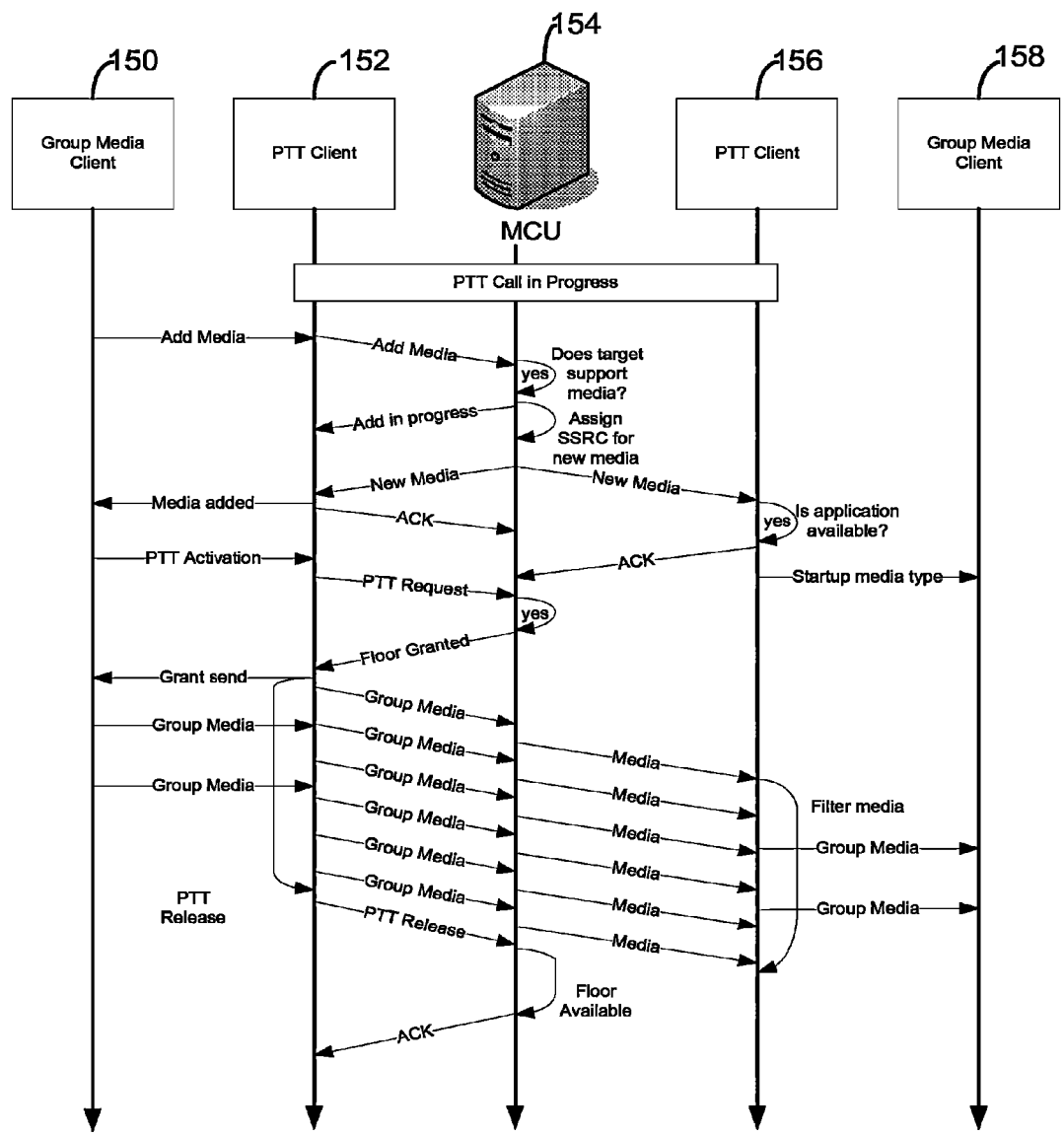
FIG. 6 is a call flow diagram of one embodiment of the group-directed media transmission occurring during a shared floor as a PTT client on the transmitting wireless communication device.

FIG. 6 is a call flow diagram of one embodiment of the group-directed media transmission occurring during a shared floor as the PTT client on the transmitting wireless communication device. A Group Media Client 150 requests to share an group-directed media with PTT call participants using the same floor control mechanism as the PTT call, one member device shown as having resident PTT Client 156 and Group Media Client 158. The group-directed media is sent in conjunction with the voice media during a PTT talk spurt. The Group Media Client 150 requests permission to talk and send data at the same time. In this scenario, the user is participating in a PTT call, and the user performs a function to the Group Media Client 150 that results in the Group Media Client 150 requesting to share data with the PTT call participants. The Group Media Client 150 determines that the data can be shared during a subsequent talk bust from the user. That is, there is only a single floor control mechanism that is used for both the PTT call and the sharing of group-directed media.

The Group Media Client 150 requests the PTT Client 152 to add group-directed media to the existing PTT call. The add-media request contains an indication that the data is to be shared using the same floor control mechanism as the PTT Client 152. The PTT Client 152 requests the MCV 154 to add a new media type to the existing call. The MCV 154 verifies that the PTT call participants can support the new media type, e.g. contacts Group Media Client 158, and notifies the call participants that a new media type is being added to the PTT call. After the new media type has been successfully added to the PTT call, the user (Group Media Client 150) can request permission to talk and send group-directed media at the same time. The Group Media Client 150 notifies the PTT Client 152 that a group-directed media request has been received. The PTT Client 152 requests permission to talk and send group-directed media from the MCV 154. The MCV 154 verifies the floor is available prior to granting the floor request. The PTT Client 152 notifies the Group Media Client 150 that the floor request was granted.

Figure 7:
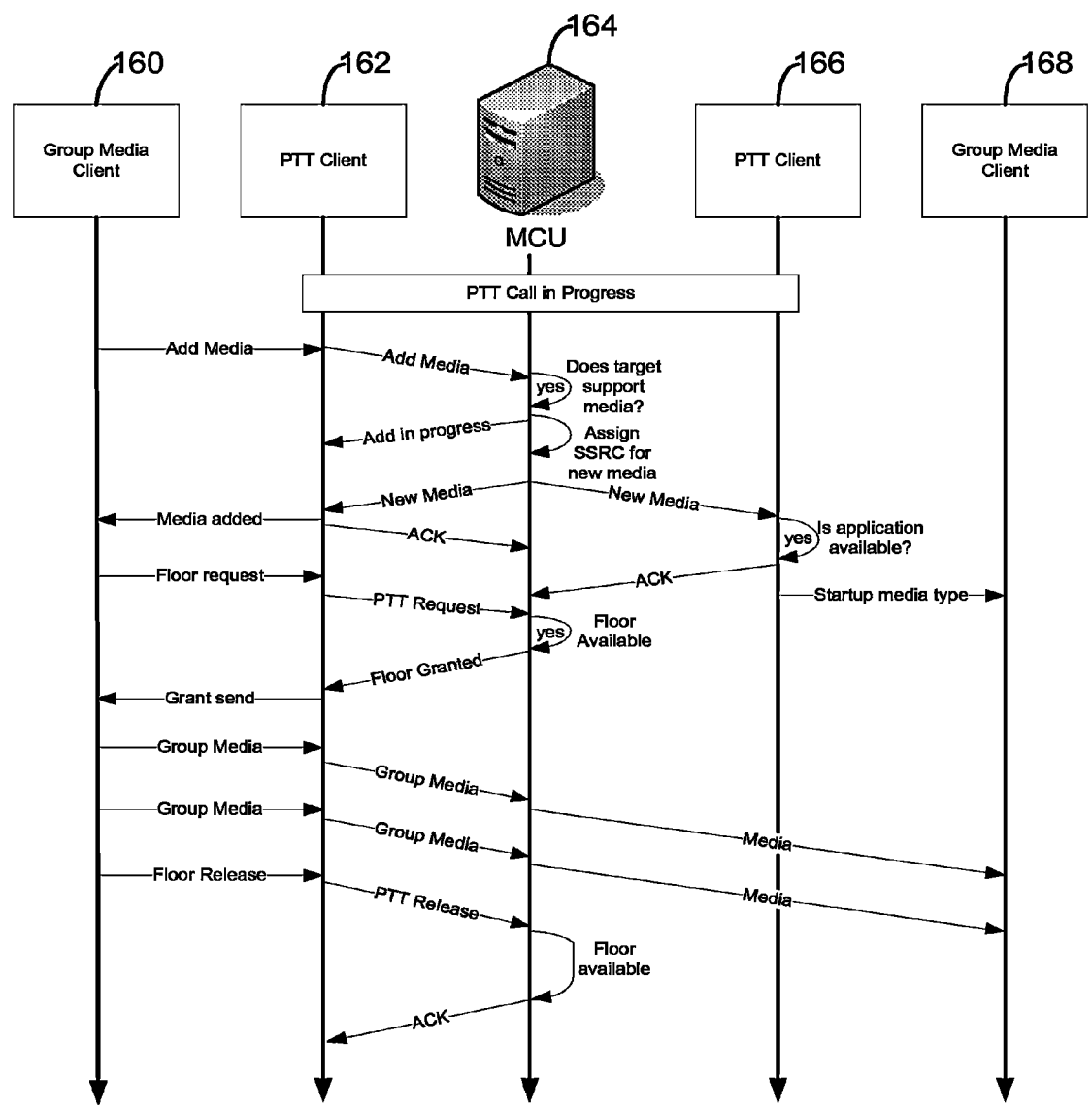
FIG. 7 is a call flow diagram of one embodiment of the group-directed media transmission occurring on a different floor from a PTT client on the transmitting wireless communication device.

FIG. 7 is a call flow diagram of one embodiment of the group-directed media transmission occurring on a different floor from the PTT client on the transmitting wireless communication device. The Group Media Client 160 requests to share group-directed media with PTT call participants using a different floor control mechanism than the PTT call. The group-directed media is accordingly sent independently of the voice media. The user must request permission to send data any time there is data that is ready to be shared with the PTT call participants. In this scenario, the user is participating in a PTT call and performs a function on the Group Media Client 160 that results in the Group Media Client 160 requesting to share data with the PTT call participants. The Group Media Client 160 determines that the data is intended to be shared using a separate floor control mechanism than the PTT call, i.e. independent of the floor control mechanism being used for the PTT call.

The Group Control Client 160 requests that the PTT Client 162 add a new media type to the existing PTT call. The add media requests contains an indication that the data is to be shared using a different floor control mechanism than the PTT call. The PTT Client 162 requests the MCV 164 to add a new media type to the existing call. The MCV 164 verifies that all of the call participants can support the new media type and notifies the call participants that a new media type is being added to the call. In this embodiment, the notification to the call participants contains a floor identifier for the group-directed media floor, in addition to a new destination port number on the MCV 164 for the distribution of the group-directed media. The PTT Client 166 of the target device assigns a new media port for sending or receiving group-directed media and sends the new port identifier in the acknowledgement to the MCV 164.

When the PTT Client 166 receives the request to add new media, the PTT Client 166 verifies that the application associated with the group media application ID is available on the client. If the Group Media Client 168 associated with the group media application ID is already active on the client, the PTT Client 166 sends a notification to the Group Media Client 168 that media was added to an existing PTT call. If the application associated with the group media application ID is not already active on the target client, the PTT Client 166 requests the mobile operating system to start the appropriate application and then notifies the Group Media Client 168 to prepare for incoming group-directed media.

After the new media type is successfully added to the PTT call, the user can request permission to send group-directed media. The Group Media Client 160 notifies the PTT Client 162 that a group-directed media send request has been received. The PTT Client requests permission to send group directed media from the MCV 164. The PTT request from the PTT Client 162 contains the floor identifier assigned to the group-directed media floor. The MCV 164 verifies the data floor is available prior to granting the floor request. The PTT Client 162 notifies the Group Media Client 160 that the floor request was granted.

Figure 8:
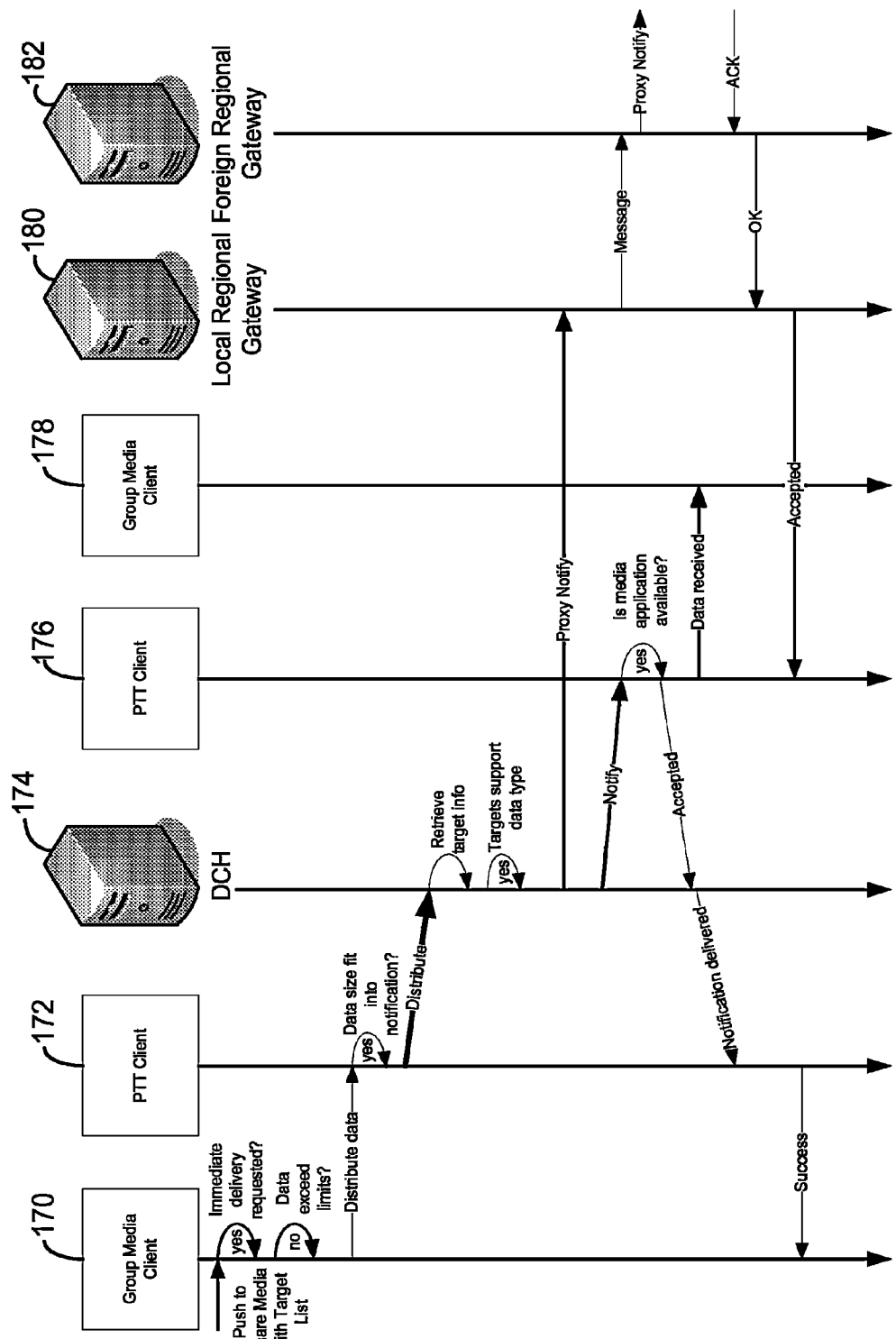
FIG. 8 is a call flow diagram of one embodiment of the system establishing immediate group-directed media transmission to multiple target devices across the wireless communication network.

FIG. 8 is a call flow diagram of one embodiment of the system establishing immediate group-directed media transmission to multiple target devices across the wireless communication network. In FIG. 8, a user has requested immediate distribution of group-directed media to multiple target users. The group-directed media does not exceed the operator-defined data distribution limit and therefore, it can immediately be provided to the target endpoints. In this embodiment, the user selects a list of target users to which group-directed media is to be delivered. The user has also requested, at the Group Media Client 170, immediate delivery of the group-directed media to the targets. The PTT Client 172 examines the delivery option specified in the request and determines that the data is required to be immediately delivered. The Group Media Client 170 compares the size of the group-directed data to make sure that it is within the operator-defined limit. Because the size is less than the data distribution limit, the Group Media Client 170 requests that the PTT Client 172 distribute the data to the targets. The PTT Client 172 verifies the data is small enough to fit into a UDP MTU containing the appropriate signaling headers and the group-directed media. The PTT Client 172 requests the DCH 174 to send an incoming data notification containing the group-directed media to the specified targets.

The DCH 174 locates each of targets in the target list and formulates an incoming data notification for each target. The group-directed media is embedded in the notification. The DCH 174 sends the notification to each target. For targets that are registered on the local carrier network, Local Gateway 180, the notification is sent directly to the PTT Client 176 at the target. For targets that are registered on a foreign carrier network, the notification may be sent to the Foreign Regional Gateway 182, which in turn converts the notification into a SIP Message method and the group-directed media is included in body of the SIP Message. Each target determines whether to accept or reject the incoming data notification. The notification may be rejected if the Group Media Client 178 target client cannot process the group-directed media or the target user has placed a communication restriction on the originator of the data distribution request.

In FIG. 8, the notification is assumed to be accepted by the targets. Because at least one target received the notification successfully, the originator is notified that the group directed distribution was successful. When the PTT Client 176 receives the notification with the group-directed media, the PTT Client 176 examines the group media application ID, which indicates the application that is to receive the group-directed media. If the application associated with the group media application ID is already active on the client, the PTT Client 176 forwards the group-directed media to the application. If the application associated with the group media application ID is not already active on the client, the PTT Client requests the mobile operating system to start the Group Media Client 178 and then forwards the group-directed media. For targets that do not support processing the group-directed media data type, the DCH 174 will not distribute the incoming data notification to targets that are incapable of processing the group-directed media contained in the message. Optionally, the DCH 174 will remove the group-directed media from the incoming data notification and send the revised notification to the targets that do not support the data type.

It should also be noted that Foreign Regional Gateway 182 with another computer device, such as desktop which could have a PTT client resident thereupon. The signaling between the Local Gateway 180 and the Foreign Regional Gateway 182 could be the same as the signaling between a Local Gateway 180 and the PC-Based client, such as a Windows based client at a desktop, laptop, or other computer platform, that could also have a wired connection 0 the Internet or other gateway. However, the resident PTT Client at such computer platform is required to handle the half-duplex communications in the group communication environment.

Figure 9:
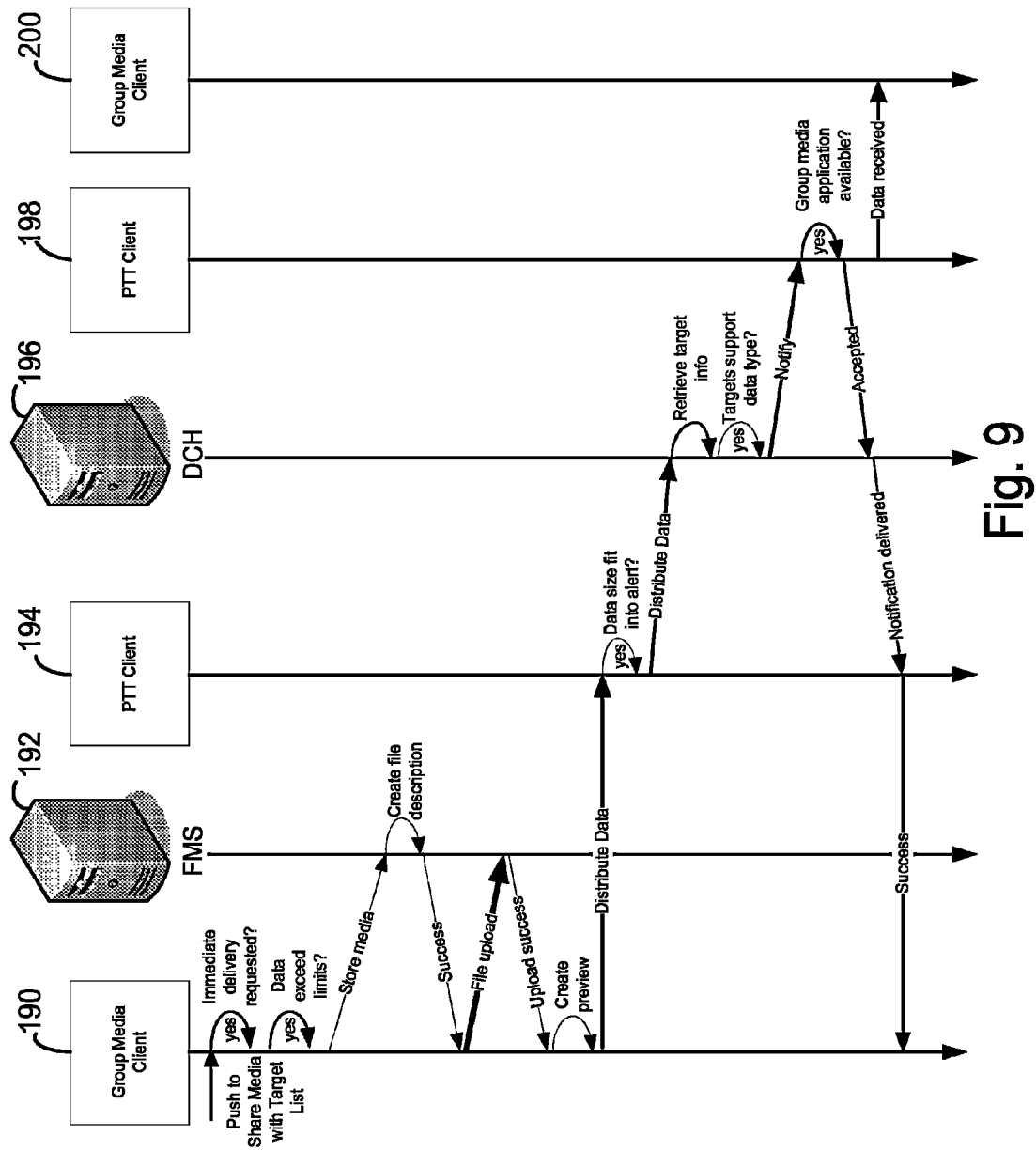
FIG. 9 is a call flow diagram of one embodiment of the distribution to target members of a file preview of a group-directed media.

FIG. 9 is a call flow diagram of one embodiment of the distribution to target members of a file preview of a group-directed media. A user has requested immediate distribution of a file to multiple target users. Here, the file exceeded the operator-defined data distribution limit and therefore, it cannot immediately be distributed to the targets. However, a preview of the file can be distributed to the targets immediately. Therefore, the file is stored at the FMS 192 and then truncated or reduced to provide a preview of the file to the target recipients. The preview portion of the file is part of the incoming data notification to the targets. The preview can be a small picture, such as a thumbnail, or a portion of the file name, or can be the file type extension, e.g. .mov, .tif, .ppt., such that the target can determine in the first instance if they want to download media of that type.

In this embodiment, the user selects a list of target users to which the group-directed media is to be delivered. In this scenario, the group-directed media selected is a large file. The user has also requested immediate delivery of the group-directed media to the targets. The Group Media Client 190 examines the delivery option specified in the request from the user and determines that the file is required to be delivered immediately. The Group Media Client 190 compares the size of the file with the operator-defined data distribution limit. Because the file size exceeds the data distribution limit, the Group Media Client 190 contacts the FMS 192 (data store) to store the file with the target list. After the Group Media Client 190 has successfully stored the file at the FMS 192, the Group Media Client 190 creates a preview of the original file. The Group Media Client 190 then requests the PTT Client 194 to deliver the preview of the group-directed media file and the file descriptor to the specified list of targets.

The PTT Client 194 verifies the preview data is small enough to fit into a VDP MTV containing the appropriate signaling header and the group-direct media preview. The PTT Client 194 requests that the DCH 196 send an incoming data notification containing the preview and the file descriptor to the specified targets. The DCH 196 locates each of targets in the target list and formulates an incoming data notification for each target. The group-media preview data (preview and the file descriptor) is embedded in the notification. The DCH 196 sends the notification to each target. Such notification can also include a hyperlink or other pointer to direct the target to the stored data. Each target determines whether to accept or reject the incoming data notification. The notification may be rejected if the target user has placed a communication restriction on the originator of the data distribution request. In this scenario, the notification is accepted by the targets. Because at least one target received the notification successfully, the originator is notified that notice of the group-directed media distribution was successful.

When the PTT Client 198 receives the notification with the preview, the PTT Client 198 examines the group media application ID, which indicates the application that is to receive the group-directed media. If the application associated with the group media application ID is already active on the client, the PTT Client 198 forwards the group-directed media to the application. If the application associated with the incoming group-directed media application is not already active on the client, the PTT Client 198 requests the mobile operating system to start the application and then forwards the group-directed media onto the Group Media Client 200. When the Group Media Client 200 receives the group-directed media, the Group Media Client 200 determines whether to download the file containing the group-directed media automatically as identified by the file descriptor in the data or to prompt the user to determine if they want a download. The Group Media Client 200 can also download the preview file from the F'MS 192.

Figure 10:
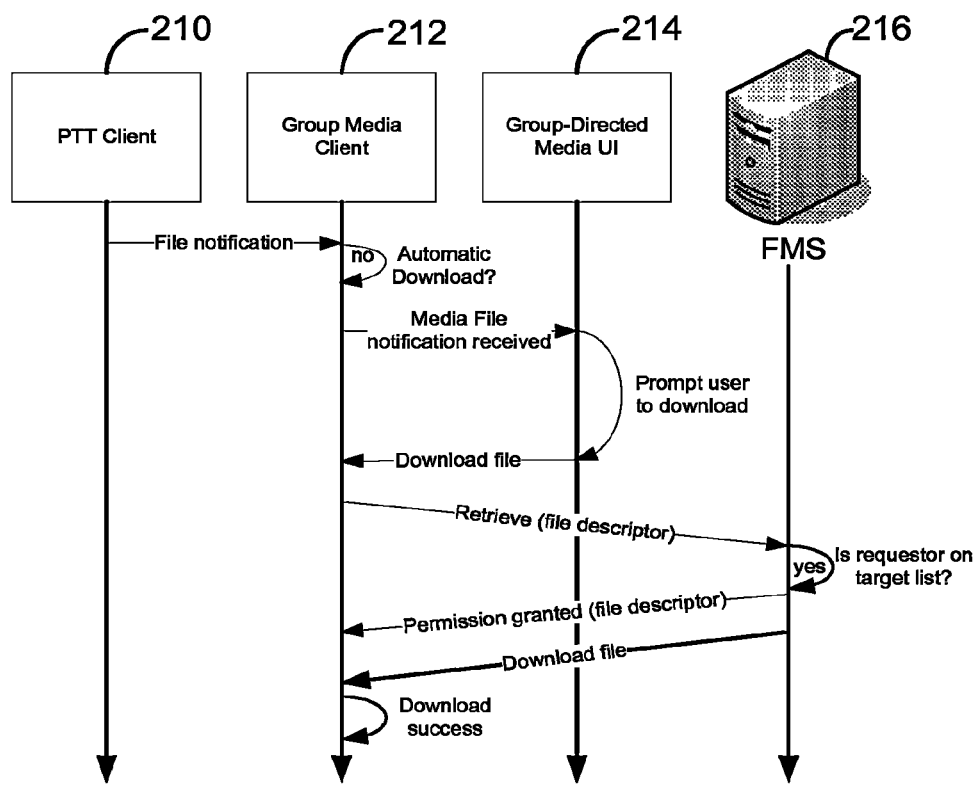
FIG. 10 is a call flow diagram of one embodiment of a file retrieval of stored group-directed media by a member of the communication group to which the group-directed media was originally sent.

FIG. 10 is a call flow diagram of one embodiment of a file retrieval of stored group-directed media by a member of the communication group 12 to which the group-directed media was originally sent. When a Group Media Client 212 receives a notification from the PTT Client 210 indicating that there is a group-directed media available at the FMS 216, the Group Media Client 212 determines, based on user settings, whether to download the group-directed media immediately or to notify the Group-Directed Media VI 214 that the group-directed media file is available for download. In the latter case, the Group-Directed Media VI 214 is responsible for prompting the user to decide when to download the file.

If the Group Media Client 212 is not configured to download the group-directed media file automatically, Group-Directed Media VI 214 prompts the user to download the file. When the user decides to download the file, the Group-Directed Media VI 214 notifies the Group Media Client 212, which proceeds to retrieve the file from the FMS 216. The FMS 216 verifies the user is on the target list (or file distribution list) prior to allowing the file download to proceed. It should be noted that the download of the stored data need not to occur substantially instantaneously or only during a PTT communication, but can occur at the discretion of the target user. Further, other embodiments may use different methods to determine whether the user is allowed or authorized to download the file.

Figure 11:
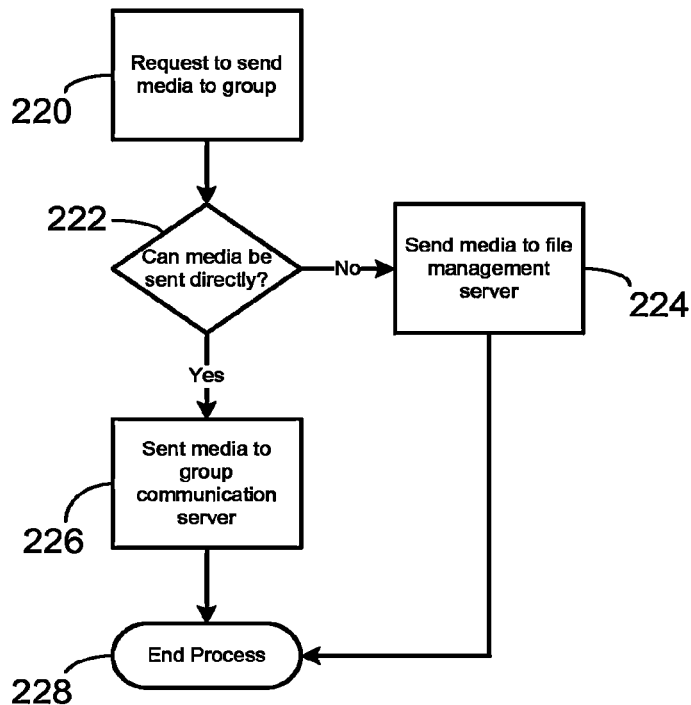
FIG. 11 is a flowchart of one embodiment of a method for a wireless communication device sending group-directed media to a communication group.

FIG. 11 is a flowchart of one embodiment of a method at a wireless communication device 14,16,18 to send group-directed media to a communication group 12. A request is made at the wireless communication device 14,16,18 to send the group-directed media, as shown at step 220, and then a determination is made as to whether the group-directed media can be sent directly to members of the group, as shown at decision 222. If the group-directed media cannot be sent directly at decision 222, then the group-directed media is sent to the file management server 224, and the process ends as shown at termination 228. Otherwise, if the group-directed media can be sent directly to the other members of the group, then the group-directed media is sent to the communication computer device (server) 32, as shown at step 226, e.g. the communication computer device will receive and relay the group-directed media to the other members of the communication group. It should be noted that the communication computer device 32 can be the sole arbiter of determining how to relay the group-directed media, and thus, no determinations on sending group communication data will occur at the wireless communication device 14,16,18, as it will solely send out the group-directed media if an appropriate communication channel is available. Then the process ends, as shown at termination 228.

Figure 12:
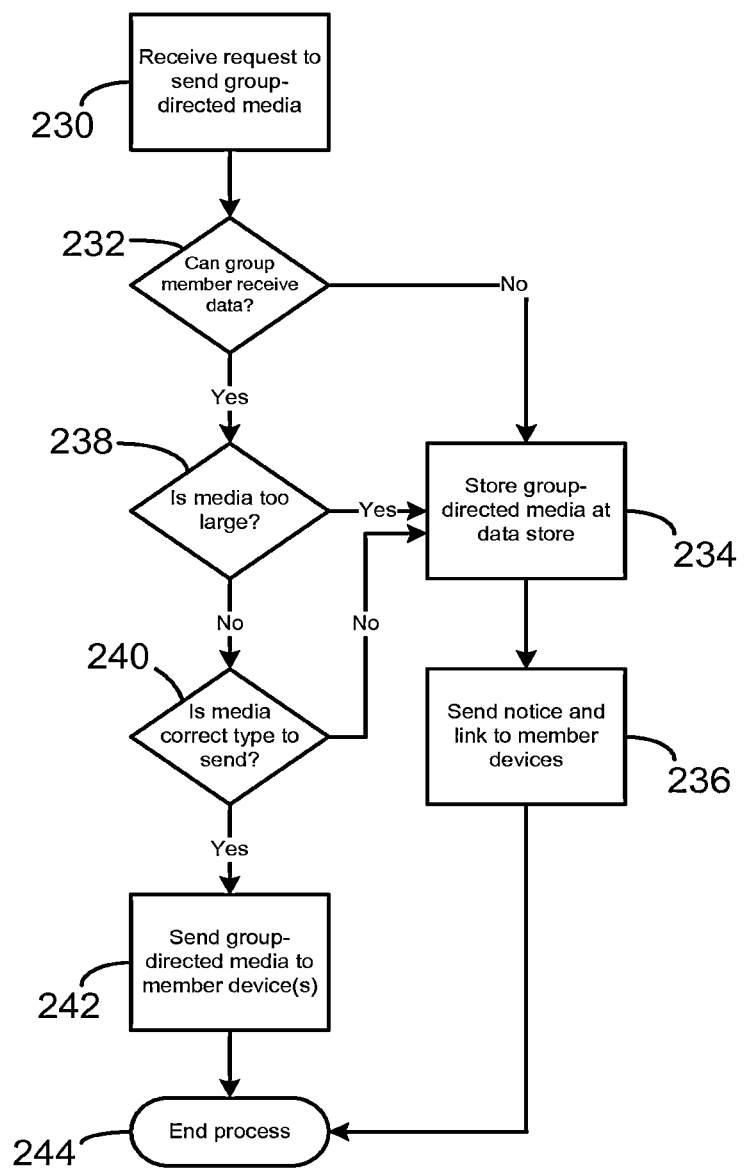
FIG. 12 is a flowchart of one embodiment of a communication computer device receiving and selectively storing or transmitting group-directed media.

FIG. 12 is a flowchart of one embodiment of a communication computer device 32 receiving and selectively storing or transmitting group-directed media. The communication computer device 32 receives a request to send group-directed media from wireless communication device 14,16,18, as shown at step 230, and then a determination is made as to whether the group members for the sending wireless communication device can receive the group-directed data directly, as shown at decision 232. For any member of the group that cannot receive the group-directed media, the group-directed media is sent to a data store 36, as shown at step 234, and a notice and link to the stored media is sent to the target wireless device unable to directly receive the group-directed media that the group-directed media is stored and awaiting download, as shown at step 236.

Otherwise, for each member of the group who can receive the group-directed media at decision 232, a determination is then made as to whether the group-directed media is too large to be directly sent, as shown at decision 238. If the media is too large at 238, the group-directed media is sent to the data store 36, as shown at step 234, and the notice and link are sent to the target device as shown at step 236. Otherwise, if the media is not too large to send at decision 238, a determination is made as to whether the media is a correct type to send to the target member, as shown at decision 240. If the media is not a type known as receivable by the target device, then the group-directed media is stored at the data store 36 (step 234) and notice and link sent to the target device (step 236). Otherwise, if the group-directed media is of a type that can be received by the target member, the group-directed media is sent to the member device(s), as shown at step 242. Then the process terminates (termination 244) after the group-directed media is sent (step 242) or the notice and link have been sent to the target devices (step 236).

It can be seen that system 10 provide an inventive method for sharing media in a group communication among a plurality of wireless communications devices 14,16,18 on a wireless communication network 20, that in one embodiment, includes receiving at a communication computer device 32 group-directed media sent from a wireless communication device 14,16,18 to other members of the communication group 12. In one embodiment, the communication computer device 32 stores information including the member wireless communication devices of one or more communication groups, and sending the group-directed media from the communication computer device 32 to one or more of the other member wireless communication devices of the communication group 12 for the sending wireless communication device 14,16,18. If the system 10 is embodied as including a data store 36 (such file management server 192) which is in communication with the communication computer device 32, the method further includes sending the group-directed media from communication computer device 32 to the data store 32, the receiving the group-designated media from the wireless communication device 14,16,18 at the data store, and selectively permitting members of the communication group for which the group-directed media is being sent to access the stored group-directed media across the wireless communication network 20.

In one embodiment, the method can include sending communication group identification data from the wireless communication device 14,16,18 to the communication computer device 32, and then sending the group-directed media from the group communication device 32 to the member wireless communication devices identified in the communication group identification data. Alternately, the wireless communication device 14,16,18 can request member data for a communication group from the communication computer device 32 prior to a wireless communication device sending group-directed media, and sending communication group identification data from the communication computer device 32 to the requesting wireless communication device 14,16,18.

The sending of the group-directed media can occur either during a group communication with the member wireless communication devices of the communication group 12, or can occur outside the group communication, as is shown in FIG. 7. Further, the method can involve multiple determinations of whether or not to send the group-directed media based upon the size of the data, the ability of the target to view the data, or the type of data being sent, such as a link to an interactive computer session or other application. The method can also include, upon receipt of the group-directed media by at least one of the member wireless devices of the communication group 12, sending an acknowledgement that at least one member wireless communication device of the communication group 12 received the group-directed media to the wireless communication device sending the group-directed media, such as shown in FIGS. 8 and 9.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A wireless communication device, comprising:
   a mobile station modem configured to communicate via a wireless communication network; and
   a processor coupled to the mobile station modem and configured with processor-executable instructions to perform operations comprising:
   communicating as a member of a communication group of wireless communication devices that communicate with each other in direct group communications across the wireless communication network;
   selectively sending group-directed media to a group communication computer device across the wireless communication network with instructions to send the group-directed media to other members of the communication group; and
   receiving in the wireless communication device an acknowledgment that the group-directed media was received by at least one member wireless device of the communication group.

2. The wireless communication device of claim 1, wherein the processor is configured with processor-executable instructions to perform operations further comprising receiving group-directed media from at least one wireless communication device across the wireless communication network.

3. The wireless communication device of claim 1, wherein the processor is configured with processor-executable instructions to perform operations such that the sent group-directed media is graphic media.

4. The wireless communication device of claim 1, wherein the processor is configured with processor-executable instructions to perform operations such that the sent group-directed media is streaming media.

5. The wireless communication device of claim 4, wherein the processor is configured with processor-executable instructions to perform operations such that the sent group-directed media is an interactive session on another computer device on the wireless communication network.

6. The wireless communication device of claim 4, wherein the processor is configured with processor-executable instructions to perform operations such that sending group-directed media to the group communication computer device across the wireless communication network with instructions to send the group-directed media to other members of the communication group comprises sending a hyperlink to the group communication computer device across the wireless communication network with instructions to send the hyperlink to the other members of the communication group, the hyperlink providing a link to the group-directed media stored at a data store.

7. The wireless communication device of claim 1, wherein the processor is configured with processor-executable instructions to perform operations further comprising sending communication group identification data to the group communication computer device along with the group-directed media.

8. The wireless communication device of claim 1, wherein the processor is configured with processor-executable instructions to perform operations further comprising requesting member data for a communication group from the group communication computer device prior to sending the group-directed media.

9. The wireless communication device of claim 1, wherein the processor is configured with processor-executable instructions to perform operations such that selectively sending group-directed media to the group communication computer device is accomplished when the wireless communication device is engaged in a group communication with other wireless communication devices of the communication group.

10. A method for sharing media from a wireless communication device in a group communication among a plurality of wireless communications devices that communicate with each other in direct group communications across a wireless communication network, the method comprising:
sending group-directed media from the wireless communication device to a group communication computer device with instructions to send the group-directed media to other members of the communication group; and
receiving in the wireless communication device an acknowledgment that the group-directed media was received by at least one member wireless device of the communication group.

11. The method of claim 10, wherein sending group-directed media comprises sending graphic media.

12. The method of claim 10, wherein sending group-directed media comprises sending streaming media.

13. The method of claim 10, wherein sending group-directed media comprises sending a link to an interactive session on another computer device on the wireless communication network.

14. The method of claim 13, wherein sending group-directed media from the wireless communication device to the group communication computer device with instructions to send the group-directed media to other members of the communication group comprises sending a hyperlink to the group communication computer device with instructions to send the hyperlink to the other members of the communication group.

15. The method of claim 10, further comprising receiving group-directed media at the wireless communication device from another wireless communication device across the wireless communication network.

16. The method of claim 10, further comprising sending communication group identification data from the wireless communication device to the group communication computer device prior to sending the group-directed media.

17. The method of claim 10, further comprising requesting member data for a communication group from the group communication computer device prior to sending the group-directed media.

18. The method of claim 10, further comprising receiving a preview of group-directed media that is requested to be sent to the wireless communication device from another computer device across the wireless communication network.

19. A wireless communication device, comprising:
means for sending group-directed media to a group communication computer device via a wireless communication network with instructions to send the group-directed media to other members of a communication group; and
means for receiving in the wireless communication device an acknowledgment that the group-directed media was received by at least one member wireless device of the communication group.

20. The wireless communication device of claim 19, wherein means for sending group-directed media comprises means for sending graphic media.

21. The wireless communication device of claim 19, wherein means for sending group-directed media comprises means for sending streaming media.

22. The wireless communication device of claim 19, wherein means for sending group-directed media comprises means for sending a link to an interactive session on another computer device on the wireless communication network.

23. The wireless communication device of claim 22, wherein means for sending group-directed media from the wireless communication device to the group communication computer device with instructions to send the group-directed media to other members of the communication group comprises means for sending a hyperlink to the group communication computer device with instructions to send the hyperlink to the other members of the communication group.

24. The wireless communication device of claim 19, further comprising means for receiving group-directed media at the wireless communication device from another wireless communication device across the wireless communication network.

25. The wireless communication device of claim 19, further comprising means for sending communication group identification data from the wireless communication device to the group communication computer device prior to sending the group-directed media.

26. The wireless communication device of claim 19, further comprising means for requesting member data for a communication group from the group communication computer device prior to sending the group-directed media.

27. The wireless communication device of claim 19, further comprising means for receiving a preview of group-directed media that is requested to be sent to the wireless communication device from another computer device across the wireless communication network.

28. A non-transitory processor-readable storage medium having stored thereon processor-executable instructions configured to cause a processor of a wireless communication device to perform operations, comprising:
   sending group-directed media to a group communication computer device via a wireless communication network with instructions to send the group-directed media to other members of a communication group; and
   receiving in the wireless communication device an acknowledgment that the group-directed media was received by at least one member wireless device of the communication group.

29. The non-transitory processor-readable medium of claim 28, wherein the stored processor-executable instructions are configured to cause the wireless communication device to perform operations such that sending group-directed media comprises sending graphic media.

30. The non-transitory processor-readable medium of claim 28, wherein the stored processor-executable instructions are configured to cause the wireless communication device to perform operations such that sending group-directed media comprises sending streaming media.

31. The non-transitory processor-readable medium of claim 28, wherein the stored processor-executable instructions are configured to cause the wireless communication device to perform operations such that sending group-directed media comprises sending a link to an interactive session on another computer device on the wireless communication network.

32. The non-transitory processor-readable medium of claim 31, wherein the stored processor-executable instructions are configured to cause the wireless communication device to perform operations such that sending group-directed media from the wireless communication device to a group communication computer device with instructions to send the group-directed media to other members of the communication group comprises sending a hyperlink to the group communication computer device with instructions to send the hyperlink to the other members of the communication group.

33. The non-transitory processor-readable medium of claim 28, wherein the stored processor-executable instructions are configured to cause the wireless communication device to perform operations further comprising receiving group-directed media at the wireless communication device from another wireless communication device across the wireless communication network.

34. The non-transitory processor-readable medium of claim 28, wherein the stored processor-executable instructions are configured to cause the wireless communication device to perform operations further comprising sending communication group identification data from the wireless communication device to the group communication computer device prior to sending the group-directed media.

35. The non-transitory processor-readable medium of claim 28, wherein the stored processor-executable instructions are configured to cause the wireless communication device to perform operations further comprising requesting member data for a communication group from the group communication computer device prior to sending the group-directed media.

36. The non-transitory processor-readable medium of claim 28, wherein the stored processor-executable instructions are configured to cause the wireless communication device to perform operations further comprising receiving a preview of group-directed media that is requested to be sent to the wireless communication device from another computer device across the wireless communication network.

* * * * *